US005341657A

United States Patent [19]

Fuller

[11] Patent Number: 5,341,657

[45] Date of Patent: Aug. 30, 1994

[54] BEVERAGE COOLER AND CONTAINER APPARATUS

[76] Inventor: James M. Fuller, P.O. Box 16, 1301 Capeheart, Ingleside, Tex. 78362

[21] Appl. No.: 69,748

[22] Filed: Jun. 1, 1993

[51] Int. Cl.[5] .......... A47J 45/06; B65B 3/04

[52] U.S. Cl. .......... 62/389; 62/398; 220/754; 220/756; 220/758

[58] Field of Search .......... 62/294, 457.1, 389, 62/396, 398, 400; 220/737, 738, 739, 903, 606, 608, 635, 752, 754, 756, 758

[56] References Cited

U.S. PATENT DOCUMENTS

| | | | |
|---|---|---|---|
| 862,312 | 8/1907 | Cory | 62/294 |
| 1,142,210 | 6/1915 | Wagner | 62/294 |
| 1,183,197 | 5/1916 | Henderson | 62/400 |
| 1,489,754 | 4/1924 | Fruen | 62/389 |
| 1,965,726 | 7/1934 | Smith | 220/737 |
| 3,307,752 | 3/1967 | Anderson | 220/758 |
| 4,582,215 | 4/1986 | Barrash | 220/754 |
| 4,846,236 | 7/1989 | Deruntz | 62/294 X |
| 4,874,023 | 10/1989 | Ulm | 62/389 X |

*Primary Examiner*—Henry A. Bennet
*Assistant Examiner*—William C. Doerrler
*Attorney, Agent, or Firm*—E. Michael Combs

[57] ABSTRACT

A beverage cooler arranged to complementarily receive and secure a coolant jug therewithin is provided, wherein a puncture tip is directed into the neck of the coolant jug to direct fluid flow therefrom into an outlet conduit. A drain conduit is provided permitting drainage of water runoff from melting ice and the like within the cooler structure.

4 Claims, 5 Drawing Sheets

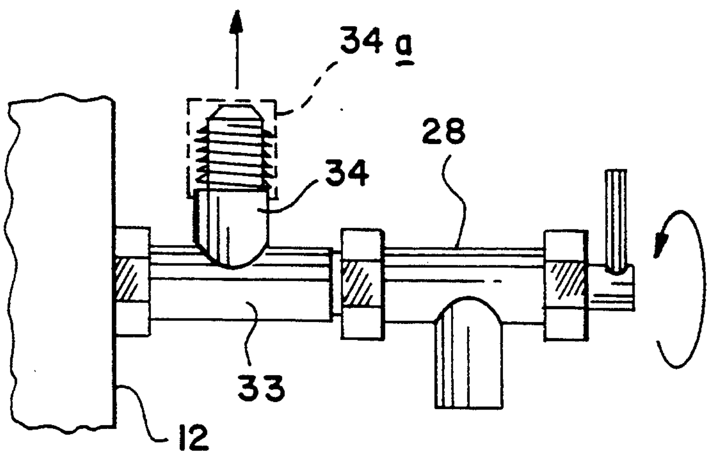
FIG. 5
FIG. 6
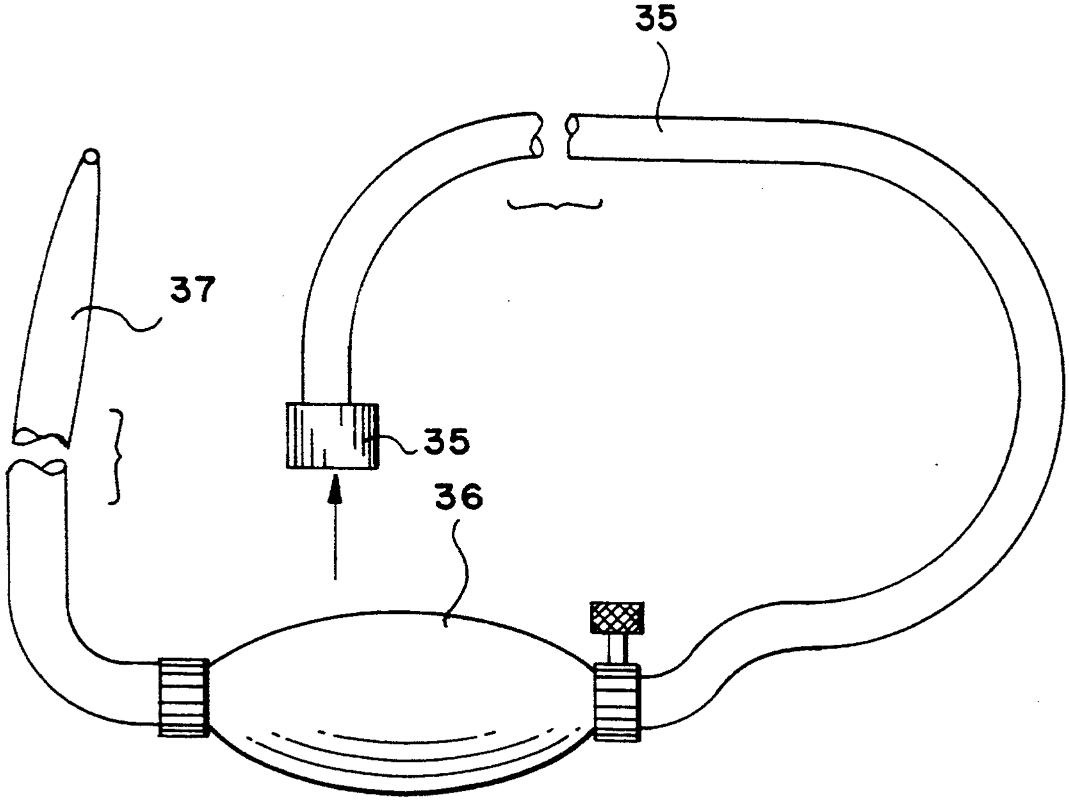

BEVERAGE COOLER AND CONTAINER APPARATUS

BACKGROUND OF THE INVENTION

1. Field of the Invention

The field of invention relates to coolant and beverage container structure, and more particularly pertains to a new and improved beverage cooler and container apparatus wherein the same is directed to the secure positioning and orientation of a coolant jug in an inverted orientation within the container structure.

2. Description of the Prior Art

Coolant jugs of various types are provided in the prior art to maintain beverages and the like in a desired temperature range for consumption. To this end, prior art examples include the U.S. Pat. Nos. 4,802,344; 4,651,538; 3,443,397; and 4,958,505.

The instant invention attempts to overcome deficiencies of the prior art by providing for a secure and complementary manner of securing a coolant jug within a rigid container structure and in this respect, the present invention substantially fulfills this need.

SUMMARY OF THE INVENTION

In view of the foregoing disadvantages inherent in the known types of beverage coolant container structure now present in the prior art, the present invention provides a beverage cooler and container apparatus wherein the same is arranged to secure and maintain a beverage jug in an inverted configuration within a container. As such, the general purpose of the present invention, which will be described subsequently in greater detail, is to provide a new and improved beverage cooler and container apparatus which has all the advantages of the prior art beverage cooler structure and none of the disadvantages.

To attain this, the present invention provides a beverage cooler arranged to complementarily receive and secure a coolant jug therewithin, wherein a puncture tip is directed into the neck of the coolant jug to direct fluid flow therefrom into an outlet conduit. A drain conduit is provided permitting drainage of water runoff from melting ice and the like within the cooler structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beverage cooler and container apparatus which has all the advantages of the prior art beverage cooler structure and none of the disadvantages.

It is another object of the present invention to provide a new and improved beverage cooler and container apparatus which may be easily and efficiently manufactured and marketed.

It is a further object of the present invention to provide a new and improved beverage cooler and container apparatus which is of a durable and reliable construction.

An even further object of the present invention is to provide a new and improved beverage cooler and container apparatus which is susceptible of a low cost of manufacture with regard to both materials and labor, and which accordingly is then susceptible of low prices of sale to the consuming public, thereby making such beverage cooler and container apparatus economically available to the buying public.

Still yet another object of the present invention is to provide a new and improved beverage cooler and container apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an orthographic view of an outlet tube structure between the side wall and valve of the invention.

FIG. 6 is an orthographic view of a squeeze bulb pump assembly for use by the invention.

DESCRIPTION OF THE PREFERRED EMBODIMENT

Figure 1:
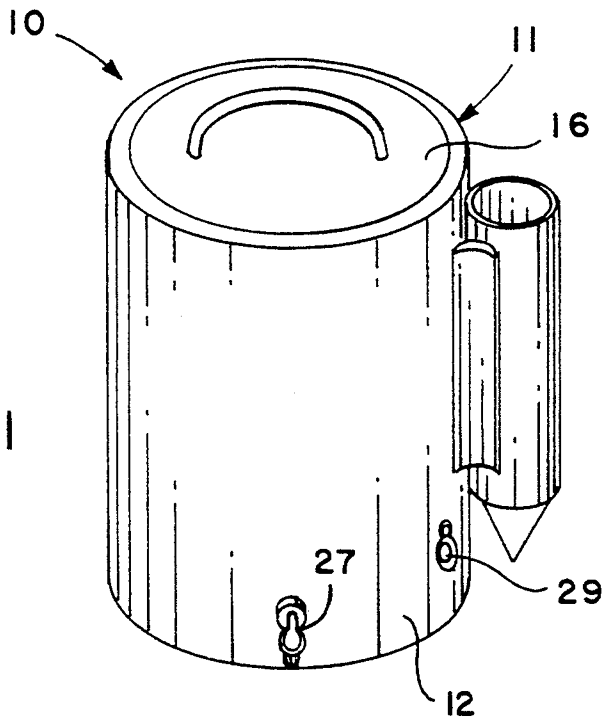
FIG. 1 is an isometric illustration of the invention.
Figure 2:
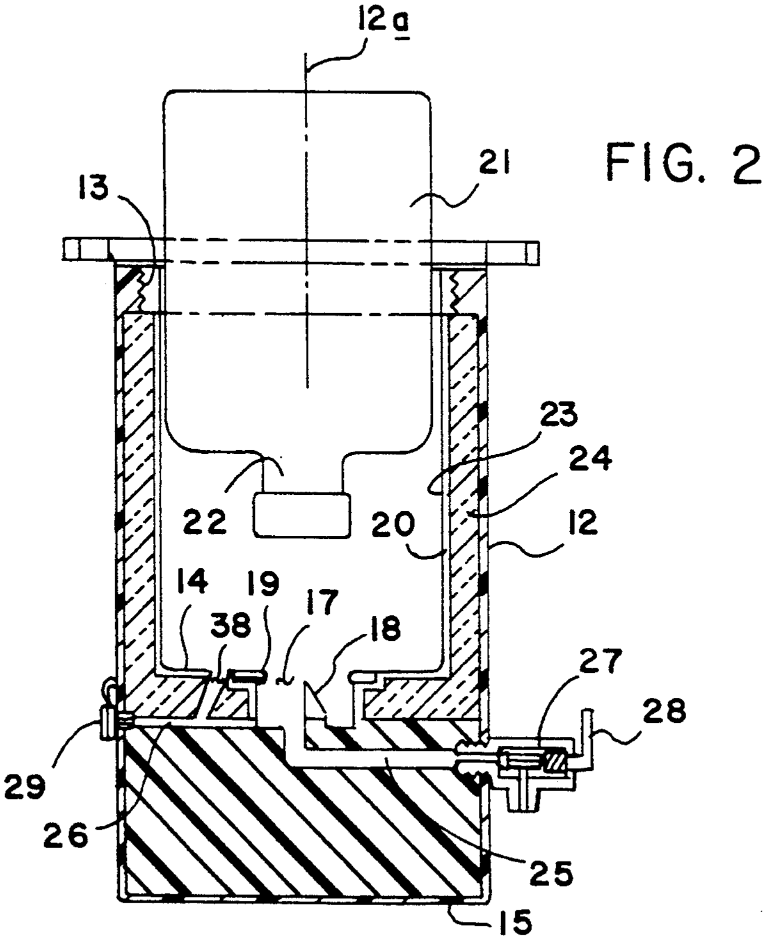
FIG. 2 is an orthographic cross-sectional illustration of the invention.
Figure 3:
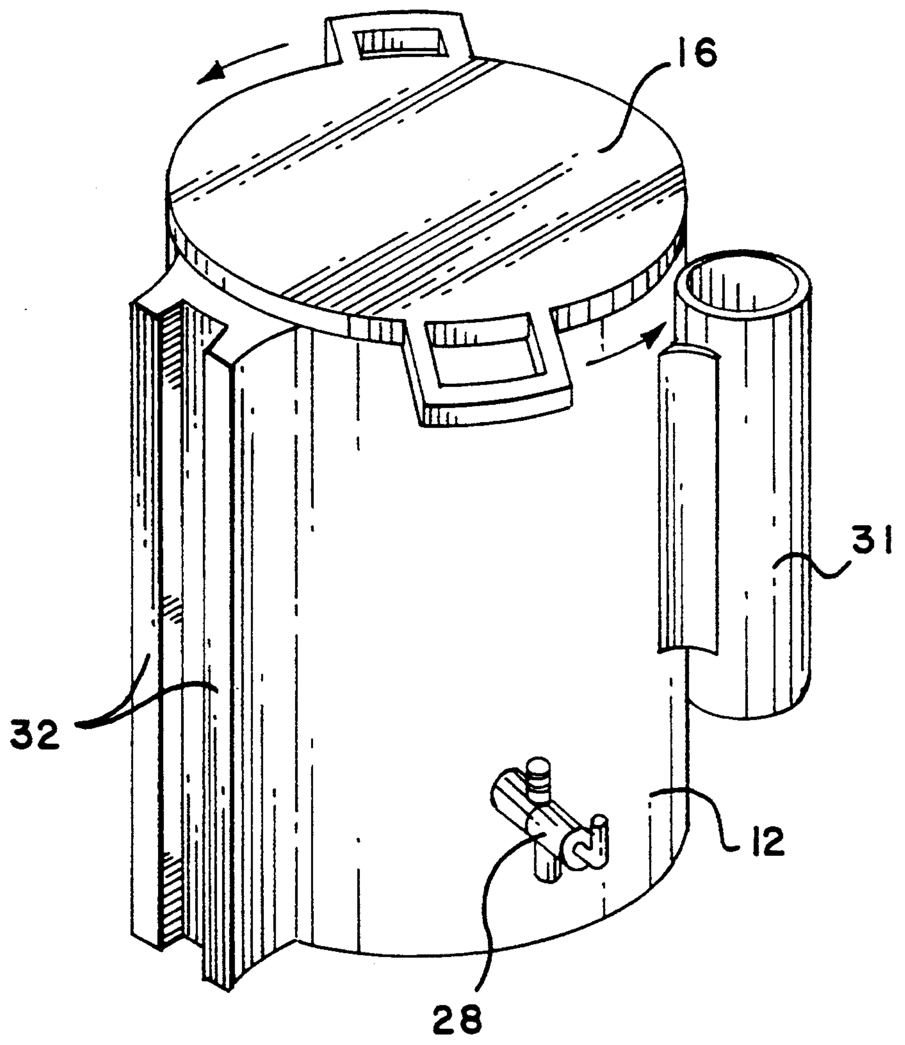
FIG. 3 is an isometric illustration of a modified side wall structure of the invention.

With reference now to the drawings, and in particular to FIGS. 1 to 9 thereof, a new and improved beverage cooler and container apparatus embodying the principles and concepts of the present invention and generally designated by the reference numeral 10 will be described.

More specifically, the beverage cooler and container apparatus 10 of the instant invention essentially comprises a rigid container body 11, having a housing side wall 12 coaxially symmetrically oriented relative to a predetermined axis 12*a*. The side wall 12 includes an internally threaded entrance end 13 spaced from a housing floor 14. The housing floor 14 is spaced from the housing bottom wall 15, with a floor opening 17 coaxially aligned relative to the axis 12*a*, and in fluid communication with a first fluid conduit 25 directed through the side wall 12 from the floor 14 terminating in a first valve member 27 operative through a valve member handle 28 directing selective fluid flow through the valve member 27. A second fluid conduit 26 is in communication with the interior of the housing through the housing floor 14, with the second fluid conduit 26 directed through the side wall 12, having a removable second conduit plug 29 permitting selective fluid flow through the second conduit 26 to permit drainage of fluid received on the floor 14 from various cooling components such as ice and the like, wherein a by-pass conduit 38 is in fluid communication between the floor 14 and the second conduit 26, as illustrated.

Figure 4:
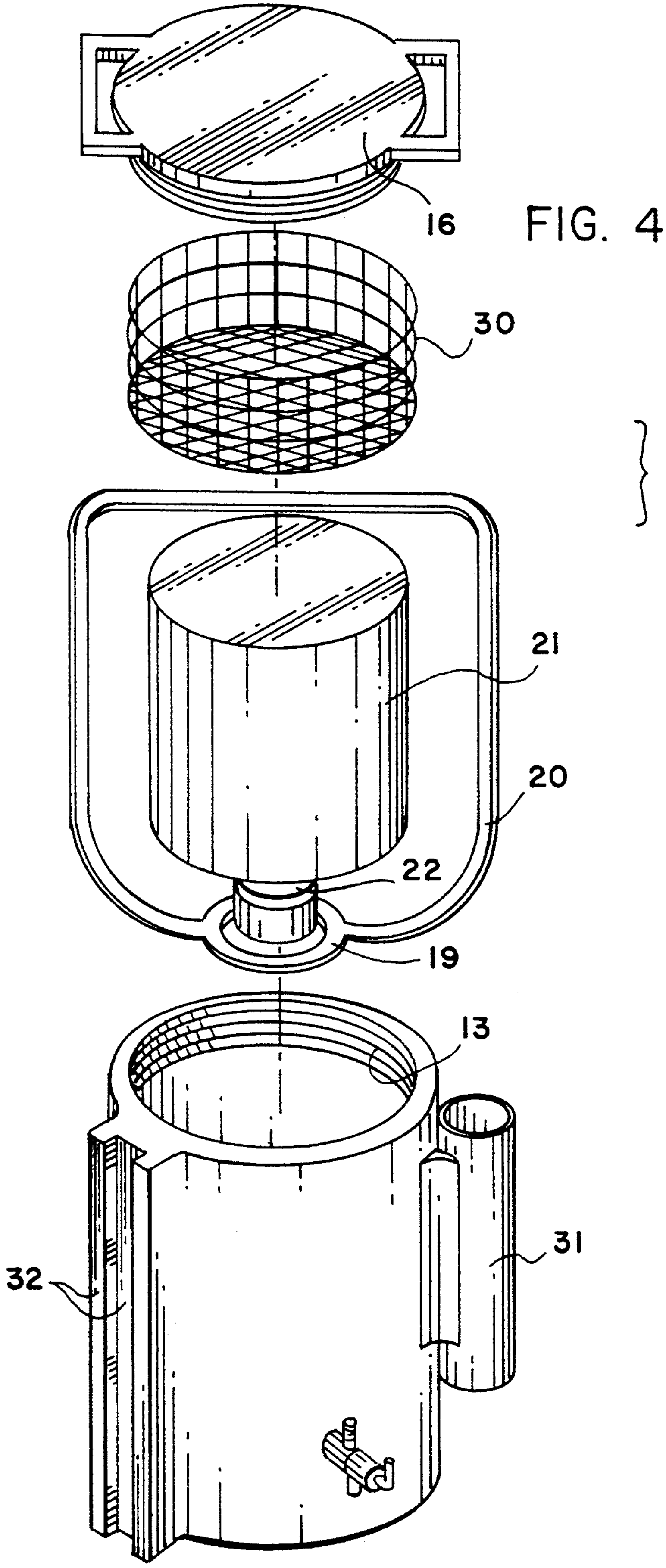
FIG. 4 is an isometric illustration of the invention in an exploded view.
Figure 7:
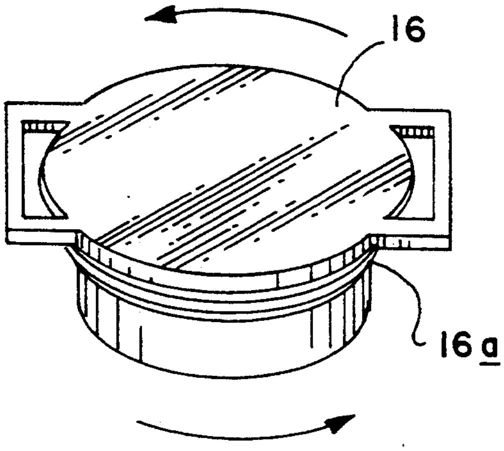
FIG. 7 is an isometric illustration of the lid structure.
Figure 8:
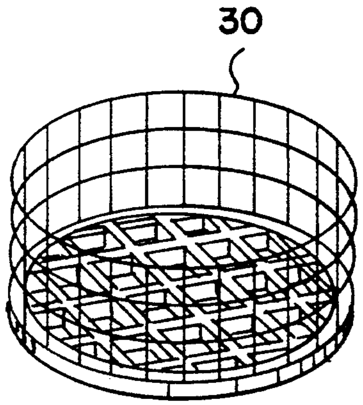
FIG. 8 is an isometric illustration of the basket structure.
Figure 9:
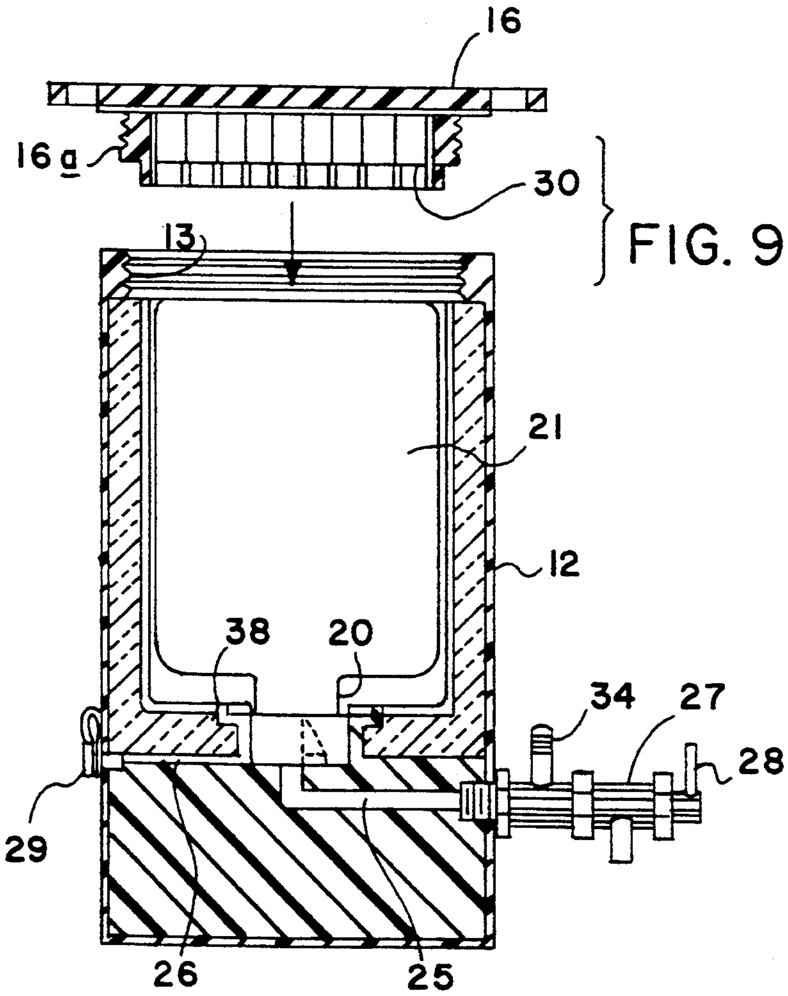
FIG. 9 is an orthographic view of the organization arranged for assemblage.

A piercer tip 18 is oriented coaxially of the floor opening 17 for projection into the neck 22 of a fluid jug 21 directed in an inverted orientation onto the floor 14, with the neck 22 directed into the floor opening 17. A sealing ring 19 (see FIG. 3) is provided for providing sealing of the neck relative to the first and second conduits, with the sealing ring 19 oriented about the neck, having an elastomeric strap 20 extending from the sealing ring directed along the annular side wall of the jug and extending over the jug floor, in a manner as indicated in FIG. 4 for example. It should be further noted that the interior wall 23 of the housing is spaced from the housing side wall 12 providing for insulative material 24 to be directed therebetween, as well as between the bottom wall 15 and the housing floor 14.

As illustrated in FIG. 4 for example, a basket 30 is provided to receive ice thereon for enhanced cooling of the jug body 21 and fluid contained therewithin. Further for enhanced ease of usage of the organization, skids 32 are oriented parallel to the axis 12*a* and directed along an exterior surface of the side wall 12 for ease of manipulation of the structure along a surface, and wherein a cup holder tube 31 is provided in a spaced orientation relative to the skids for receiving paper cups and the like, in a manner as indicated in FIG. 1, for convenience of usage.

FIGS. 5 and 6 indicates the use of a connecting port 34 in fluid communication with a first valve tube 33 between the valve 28 and the housing side wall 12. A flexible conduit 35 is arranged for securement to the connecting port 34 by means of a conduit coupling 35*a*, wherein a squeeze bulb pump member 36 is provided to direct fluid through the flexible conduit 35 and through an outlet conduit 37. In this manner, due to inoperativeness of the valves 28, the flexible conduit structure 35 may be employed as an alternative. It should be understood that a cap member 34*a* is arranged for sealed mounting upon the connecting port 34 during non-use of the connecting port 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A beverage container apparatus, comprising,
 a rigid container housing symmetrically oriented about a housing axis, having a housing side wall, and the housing side wall including an internally threaded entrance end, and the housing further including a housing floor spaced from the entrance end, the housing floor orthogonally oriented relative to the axis and including a floor opening coaxially aligned with said axis, the housing including a lid arranged for threaded engagement with the entrance end, and
 a piercer tip coaxially aligned with the axis oriented medially of the floor opening, and
 a fluid jug having a jug neck, wherein the jug neck is arranged for reception through the floor opening, with the piercer tip arranged for reception through the neck for piercing within the neck directing fluid flow from the fluid jug through the floor opening, and
 a first fluid conduit in fluid communication with the floor opening, and
 the housing including a housing bottom wall spaced from said housing floor, with the first fluid conduit oriented between the bottom wall and the floor, and
 the first fluid conduit directed through the container housing into communication with the housing side wall, and having a first valve member mounted to the side wall in operative fluid communication with the first fluid conduit, and
 a second fluid conduit directed through the side wall, and including a by-pass conduit extending in fluid communication from the second fluid conduit into and through the floor, and
 a sealing ring mounted about the jug neck, and the jug further including a jug side wall and a jug bottom wall, with an elastomeric strap extending from the sealing ring extending along the jug side wall and along the jug floor permitting ease of grasping in removal and insertion of the jug relative to the housing floor.

2. An apparatus as set forth in claim 1 including a second valve member directed through the side wall in fluid communication with the second fluid conduit.

3. An apparatus as set forth in claim 2 including a plurality of rigid skids mounted to the housing side wall oriented parallel to the axis.

4. An apparatus as set forth in claim 3 including a first valve tube in fluid communication between the first valve member and the first fluid conduit, wherein the first valve tube projects exteriorly of the housing side wall, with the first valve tube including a connecting port, the connecting port including a removable cap, and a flexible conduit having a flexible conduit coupling arranged for securement of the flexible conduit to the connecting port, and a pump member mounted to the flexible conduit for directing fluid through the connecting port.

* * * * *